Feb. 28, 1967  A. T. SPEES  3,306,292
BANDAGE

Filed Nov. 20, 1962  2 Sheets-Sheet 1

INVENTOR.
ARTHUR T. SPEES
BY

Feb. 28, 1967  A. T. SPEES  3,306,292
BANDAGE
Filed Nov. 20, 1962  2 Sheets-Sheet 2

INVENTOR.
ARTHUR T. SPEES
BY
Mason & Graham

United States Patent Office 3,306,292
Patented Feb. 28, 1967

3,306,292
BANDAGE
Arthur T. Spees, 633 S. Carondolet St.,
Los Angeles, Calif. 90057
Filed Nov. 20, 1962, Ser. No. 238,851
4 Claims. (Cl. 128—268)

This invention has to do with bandages of the type having an absorbent pad disposed on a flexible strip or sheet provided with a coating of pressure-sensitive adhesive for attaching the bandage to the user.

An object of the invention is to provide a bandage having a conventional-type absorbent pad on a strip or sheet of pressure-sensitive-coated material incorporating novel means for containing a sealed supply of a suitable liquid medicament or other substance that can be released at will.

More particularly it is an object to incorporate in a conventional bandage a sealed container in the nature of a flexible pouch or bag which can be readily ruptured by hand for use when desired without resorting to any instrument for the purpose and without affecting the sterility of the portion of the bandage which is applied to the injured skin area of the user.

A further object is to provide a unique construction of a laminated plastic container which is readily rupturable in a limited region or area by the force of internal pressure from the substance contained therein and induced by the application of pressure manually to the outside of the container.

In this connection it is an object to provide such a pouch or the like made of walls which are formed of a laminated thermoplastic sheet and a nonthermoplastic sheet and in which the nonthermoplastic sheet is weakened in a limited area or region.

Still another object is to provide a sealed pouch or container of the type indicated in which pressure thereon by the fingers serves to rupture the container for the escape of the contents but which is so shaped that the fingers serve to limit the escape of the contents while the fingers remain against the container.

A further object is to provide a unique means of providing a rupturable area in a wall of a container or the like wherein the wall is comprised of a laminated sheet formed of a thermoplastic sheet and a nonthermoplastic sheet.

A still further object is to provide a rupturable pouch or container which is designed to contain various types of medicaments and the like over a long period of time and maintain them in a fresh, vital and effective condition.

These and other objects will be apparent from the drawings and the following description. Referring to the drawings.

Figure 1:
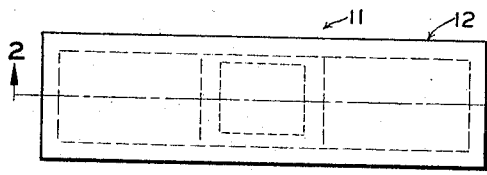
FIG. 1 is a plan view of a packaged bandage embodying the invention.
Figure 3:
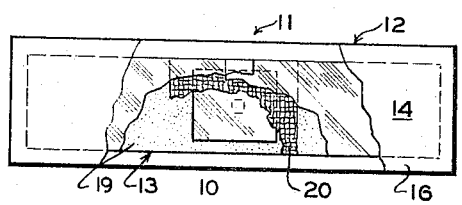
FIG. 3 is a plan view of the bandage, partially broken away.

More particularly describing the invention, referring first to FIGS. 1–6, numeral 11 designates a packaged bandage which includes an outer wrapping or package 12 enclosing the bandage proper, designated generally by 13. The outer wrapping or package may be formed of paper and comprises the two sheets 14 and 15 which are sealed or joined in any suitable manner at their peripheral regions 16. This wrapper or cover is removed or torn open for the removal of the bandage 13, and may have a tear string (not shown) for the purpose.

Figure 2:
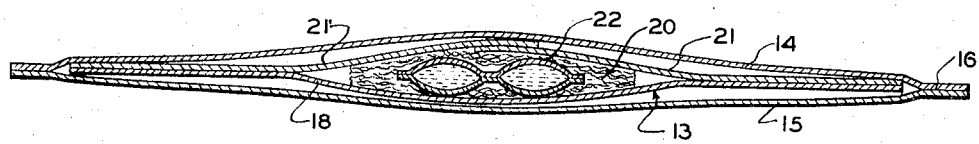
FIG. 2 is a central sectional view on line 2—2 of FIG. 1, but on a larger scale.

Referring now more particularly to FIGS. 2–6, the bandage itself includes a backing strip or sheet 18 which may conveniently be formed of a suitable flexible plastic, or cloth, provided with a pressure-sensitive adhesive coating 19 on its inner surface. Mounted centrally of the backing strip 18 is an adsorbent pad of gauze or the like, designated 20, which is normally applied directly to the wound or portion of the skin which the bandage is to cover, although some bandages have a perforate plastic layer (not shown) over this to prevent the gauze from adhering to the wound. The pad 20 remains protected when the bandage is first removed from the cover or wrapping 12 by two overlapping strips 21 and 21' which overlie the pad 20, as best shown in FIG. 2, and which are temporarily adhered to the inner surface of the backing strip 18 by the adhesive 19 thereon. The inner surfaces of these strips are normally highly glazed or smooth so that they can be readily stripped from the backing 18 without removing the adhesive therefrom. The overlapping strips are discarded just prior to using the bandage.

Within the pad 20 I provide a container, pouch or capsule 22 which may contain any suitable medicament or other desired substance having fluidity with which it is desired to impregnate the pad portion of the bandage when the bandage is ready to be used. The pouch 22 is flexible and so constructed that normally it remains completely sealed or closed, but upon the application of a predetermined amount of pressure on the pouch it will rupture in a given region for the release of the contents.

Figure 4:
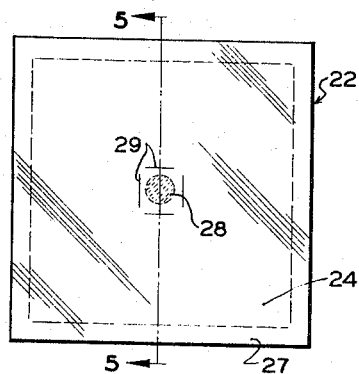
FIG. 4 is a plan view of the pouch contained in the bandage of the previous figures, but on a larger scale.
Figures 5, 6:
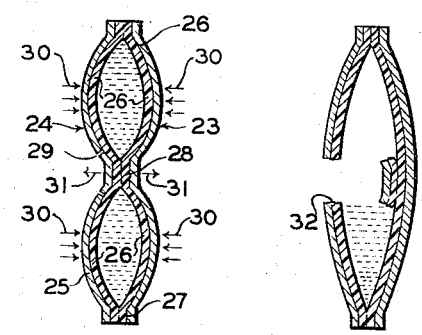
FIG. 5 is a sectional view on line 5—5 of FIG. 4.
FIG. 6 is a view similar to FIG. 5, but showing the pouch after it has been ruptured.

Referring particularly to FIGS. 4, 5 and 6, the particular pouch or capsule shown comprises two sheets designated 23 and 24, respectively, each of which is laminated, the layers being an outer layer 25 of nonthermoplastic material, such as cellophane, polyester, metal foil or paper, and an inner layer 26 of thermoplastic material, such as polyethylene or polyvinyl plastic. The sheets are united around their margins at 27 and also centrally or at some other desired region inwardly of their margins at 28. I provide slits 29 in the sheet 25 of one of the walls of the pouch. These slits or partings 29 are thus in the nonthermoplastic portion of the laminated sheet material forming the wall and these may be conveniently fabricated by originally slitting the wall completely through and subsequently sealing, resealing or rejoining the material of the inner laminate 26 by heat to close the slit formed therein.

In the use of the bandage, after it has been removed from its package 12, and with the protecting or covering sheets 21, 21' still in place over pad 20, the capsule 22 can be opened or ruptured by the application of pressure by the fingers on opposite sides thereof, the direction of this external pressure being indicated by the arrows 30 on FIG. 5. The resulting rise in the internal pressure of the liquid contents causes the central bursting pressure indicated by the arrows 31 at the center of the unit in FIG. 5 and results in the capsule opening or rupturing to provide a central opening 32 as shown in FIG. 6. Early escape of the contents of the capsule is limited by the presence of the person's fingers overlying the opening. After the pouch or capsule has ruptured the covering strips 21, 21' can be removed and the bandage applied to the person or user.

Figure 4A:
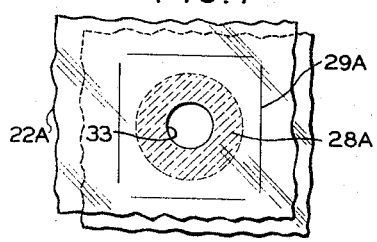
FIG. 4A is a fragmentary plan view of the center portion of a modification of the pouch of FIG. 4, but on a larger scale.

In FIG. 4A I show a modified form of pouch, designated 22A, wherein the portion 28A is apertured at 33. This is desirable in bandaging since it provides for ventilation where the bandage backing strip 18 is perforated as is the current practice.

Figure 8:
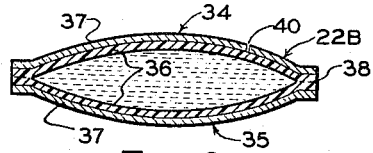
FIG. 8 is a sectional view on line 8—8 of FIG. 7.
Figure 9:
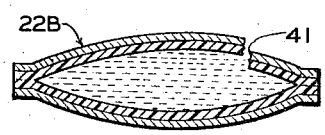
FIG. 9 is a view similar to FIG. 8, but showing the pouch ruptured.
Figure 7:
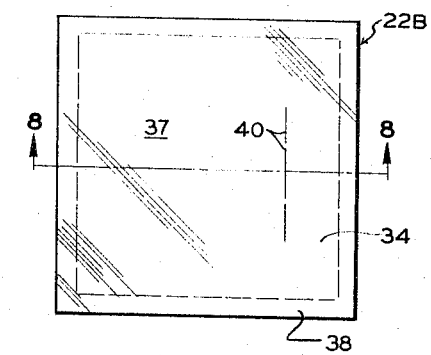
FIG. 7 is a view similar to FIG. 4, but showing a pouch embodying an alternate construction.

In FIGS. 7–9, I show an alternate form of pouch, designated 22B. This pouch also is provided with laminated walls 34 and 35, comprising nonthermoplastic outer sheets 37 and thermoplastic inner sheets 36, the walls being joined at their margins 38. This pouch is shown as provided with a series of aligned slits 40 in the wall laminate 37 of wall 34. It will be apparent that the application of sufficient pressure upon the capsule will cause the same to rupture along this line of slits and produce an opening 41 for the escape of the contents.

Figure 10:
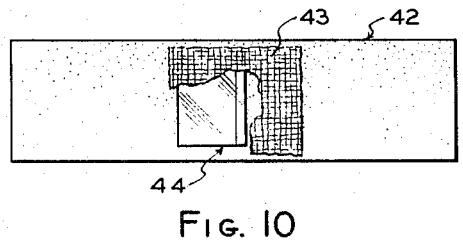
FIG. 10 is a plan view of another bandage with a portion of the pad broken away.
Figure 14:
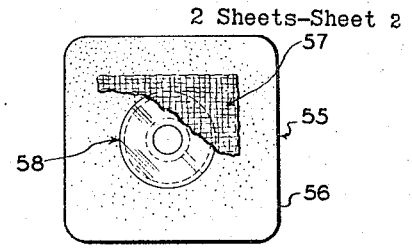
FIG. 14 is a plan view, partially broken away, of another bandage.
Figure 11:
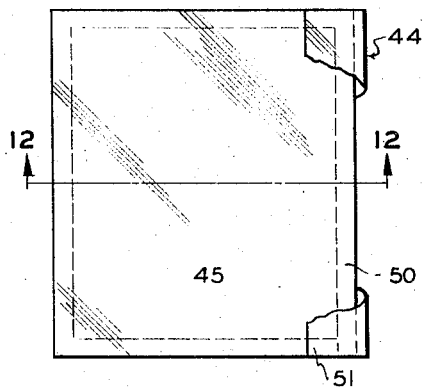
FIG. 11 is a plan view, partially broken away, of the pouch shown in the bandage of FIG. 10, but on a larger scale.
Figure 15:
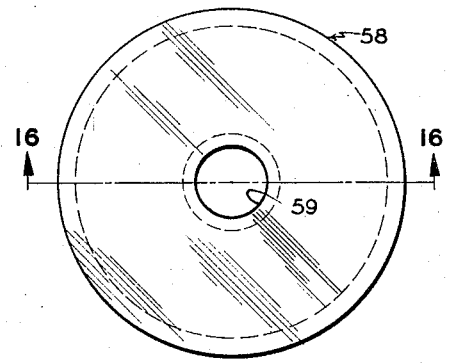
FIG. 15 is a plan view of the pouch of FIG. 14, but on a larger scale.
Figure 12:
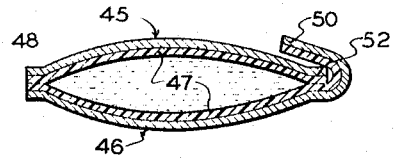
FIG. 12 is a sectional view on line 12—12 of FIG. 11.
Figure 16:
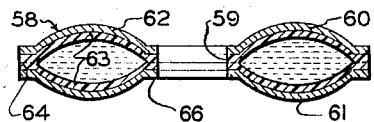
FIG. 16 is a sectional view on line 16—16 of FIG. 15.
Figure 13:
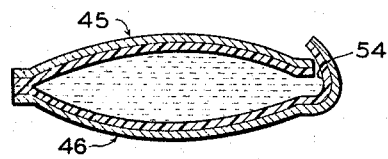
FIG. 13 is a view similar to FIG. 12, but showing the pouch ruptured.

In FIGS. 10–13, I show a form of the invention wherein a backing strip 42, similar to strip 18 previously described, has a centrally mounted pad 43 of absorbent material in this or, beneath it, a pouch 44 which is preferably placed somewhat offcenter therein so that one margin of the pouch is disposed about centrally of the bandage pad as shown in FIG. 10. In this form of the invention the pouch is formed of two sheets 45 and 46 joined along three margins at 48. These sheets are laminates of the type previously described. However, in this instance one sheet, namely, sheet 46, is longer at one edge than the other and is brought around or reversely bent to provide a flap 50 which overlies the other sheet 45. Along the region beneath the flap I provide a relatively weak seal 52 between the marginal portion of sheet 45 and sheet 46. All seals and joints can be achieved by the application of heat and pressure. The seal 52 should be substantially weaker than the seal 48 at the other three margins of the pouch so that, upon the application of pressure to the pouch, the internal pressure will cause the seal 52 to rupture and thus open the container as shown in FIG. 13, providing an open slot 54. Preferably this edge which opens is placed near the center of the pad 43, as shown in FIG. 10.

Figure 17:
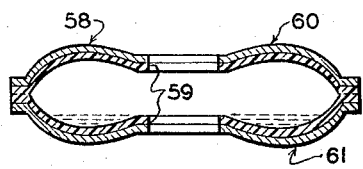
FIG. 17 is a view similar to FIG. 16, but showing the pouch ruptured.

Referring now to FIGS. 14–17, I show a substantially rectangular bandage 55 which includes a backing sheet 56 provided with a coating of pressure-sensitive adhesive on its surface and having a centrally located absorbent pad 57. Beneath the pad or within it, I provide a circular pouch 58 (which might be of other shape) being provided with a central space or opening 59. The pouch is formed of two sheets, 60 and 61, of laminated material, each embodying an outer nonthermoplastic sheet 62 and an inner thermoplastic sheet 63. The two sheets are joined at their periphery 64. Around the inner periphery or the opening 59 the sheets are also joined in the area 66. However, in this region the seal is relatively weak as compared to the peripheral seal and thus when pressure is applied to the pouch the inner seal 66 ruptures to release the contents, as shown in FIG. 17.

Although I have shown and described preferred forms of the invention, I contemplate that various changes and modifications can be made without departing from the invention. For example, while I have described the material of the pouches as being of laminate sheets in which one of the layers is a thermoplastic plastic and the other layer is a nonthermoplastic material which might be chosen from a wide variety of materials, I contemplate that the pouch could also be made from laminated sheets wherein the inner layer is not thermoplastic, but is of a relatively tough material.

I claim:

1. A sealed pouch for use in a bandage and adapted to contain a substance having the property of being fluid, comprising walls of laminate sheet material having a layer of a thermoplastic plastics material and a layer of a nonthermoplastic material united therewith, said walls being opposed with their thermoplastic layers inside the pouch, the peripheral regions of said walls being sealed together, said walls being sealed together in a region of limited area spaced inwardly of their peripheral regions, one of said walls having a relatively weak portion adjacent said region of limited area characterized by at least one interruption in the continuity of its nonthermoplastic sheet.

2. The pouch set forth in claim 1 in which said region of limited area is apertured.

3. A sealed pouch for use in a bandage and adapted to contain a substance having the property of being fluid, comprising opposing walls of sheet material having a thermoplastic plastics inner surface, said sheets being sealed together at their marginal areas, said sheets each having an aperature spaced inwardly of its margin and registering with the aperature in the other sheet, said sheets being sealed together at their edge portions marginal to the opening less strongly than at their peripheral edge portions whereby the pouch is subject to being ruptured at the opening by pressure of the contents within the pouch.

4. A sealed pouch for use in a bandage and adapted to contain a fluid substance comprising walls of flexible material, said walls comprising in part at least a laminate including a layer of a tough, relatively stretchable material and a layer of a relatively nonstretchable material, the continuity of said layer of relatively nonstretchable material being interrupted in a given area in the hollow region of the pouch to provide a weak region subject to rupturing upon substantial internal pressure of the contents of the pouch thereagainst such as induced by external pressure on other portions of the pouch.

References Cited by the Examiner

UNITED STATES PATENTS

| | | | |
|---|---|---|---|
| 2,489,675 | 11/1949 | Roberts | 128—268 |
| 2,579,403 | 12/1951 | Slomowitz et al. | 128—268 |
| 2,595,606 | 5/1952 | Pohjola | 128—268 |
| 3,053,385 | 9/1962 | Spees | 206—63.2 |

RICHARD A. GAUDET, *Primary Examiner.*

JORDAN FRANKLIN, *Examiner.*

C. F. ROSENBAUM, *Assistant Examiner.*